US007516883B2

(12) United States Patent
Hardesty et al.

(10) Patent No.: US 7,516,883 B2
(45) Date of Patent: Apr. 14, 2009

(54) FINANCIAL TRANSACTION SYSTEM WITH CONSUMER REWARD AND NET SETTLEMENT

(75) Inventors: Laurence D. Hardesty, Buckeye, AZ (US); Stephen G. Nelson, Phoenix, AZ (US)

(73) Assignee: Pluris Savings Network, LLC, Phoenix, AZ (US)

( * ) Notice: Subject to any disclaimer, the term of this patent is extended or adjusted under 35 U.S.C. 154(b) by 1226 days.

(21) Appl. No.: 10/619,304

(22) Filed: Jul. 14, 2003

(65) Prior Publication Data

US 2004/0083183 A1    Apr. 29, 2004

Related U.S. Application Data

(63) Continuation-in-part of application No. 09/619,806, filed on Jul. 20, 2000, now Pat. No. 6,592,030, which is a continuation of application No. 09/118,438, filed on Jul. 17, 1998, now Pat. No. 6,105,865.

(51) Int. Cl.
*G06K 5/00* (2006.01)
(52) U.S. Cl. .......................................... 235/380; 705/35
(58) Field of Classification Search ................. 235/380, 235/382, 375, 379, 383, 361; 705/35
See application file for complete search history.

(56) References Cited

U.S. PATENT DOCUMENTS

| 4,750,119 | A | 6/1988 | Cohen et al. |
| 4,941,090 | A | 7/1990 | McCarthy |
| 5,537,314 | A | 7/1996 | Kanter |
| 6,009,412 | A | 12/1999 | Storey |
| 6,061,660 | A | 5/2000 | Eggleston et al. |
| 6,592,030 | B1 * | 7/2003 | Hardesty ................ 235/380 |

* cited by examiner

*Primary Examiner*—Karl D. Frech
(74) *Attorney, Agent, or Firm*—Gregory J. Nelson

(57) ABSTRACT

A financial transaction system in which a participant may make a purchase of goods or services from a merchant using an access device such as a payment card. Upon approval, the transaction is routed for net settlement of all funding to a Program Manager that applies logic to the transaction to calculate a merchant funded loyalty reward to the participant and administration and bank association fees. The bank association funds the merchant's account net rebate and other fees. The participant's rebate, if in cash, is placed in an investment account which may be interest bearing and is distributed upon the occurrence of an event such as retirement. The rebate provides the participant a convenient way to save money while also providing business benefits to the merchants.

19 Claims, 3 Drawing Sheets

FINANCIAL TRANSACTION SYSTEM WITH CONSUMER REWARD AND NET SETTLEMENT

This application is a continuation-in-part of Ser. No. 09/619,806, filed Jul. 20, 2000, now U.S. Pat. No. 6,592,030 which is a continuation of Ser. No. 09/118,438, filed Jul. 17, 1998, now U.S. Pat. No. 6,105,865, issued Aug. 20, 2000, both of which are incorporated by reference.

FIELD OF INVENTION

The present invention relates to a financial system and more particularly relates to a financial transaction processing and management system for acquiring data and creating, funding and administering a large number of accounts which are established and held for the benefit of consumers that participate in the resulting benefit program in which an investment account is funded by benefit sponsors when participating consumers purchase goods and services. The system is of particular benefit to the individual or household that may not be adequately providing for retirement or other significant future expenses.

BACKGROUND OF THE INVENTION

The current economy continues to move rapidly toward cashless (electronic) modes and devices for the fulfillment of both consumer and commercial transactions. The most common device is the payment card or "plastic" as it is commonly called. Generally, payment cards are issued by a bank or financial institution under license from an organization such as MasterCard or VISA. Payment cards may also be issued directly by organization such as Discover and American Express. In all cases, the issuing entities establish networks of merchants that accept the cards. Banks, payment card processors and other market participants service the accounts, fund, clear and settle the transactions and mange dispute resolution processes. Consumers can then use the payment cards to purchase goods and services from the merchants. The merchants, in turn, pay a percentage of the transaction, usually between 1.65% and 2.75%, to the various institutions participating in the integrated payment card enterprise relating to that transaction.

In order to promote the use of a particular payment card and to induce merchants to participate in the resulting enterprise by accepting payment cards as a form of payment, payment card issuers rely on a wide variety of marketing tools and advertising techniques. For example, some payment card companies offer special discounts to card users if they buy particular products or services. Other payment card issuers offer airline frequent flyer miles or "points" redeemable for goods and services and yet other card issuers, such as Discover, rebate a small percentage of each qualifying transaction to the consumer, typically in the order of one or two percent. Other types of promotional devices include future shopping credits based on payment card activity, which may be used when purchasing large ticket items such as vehicles or appliances.

In addition to the conventional payment card, other types of non-payment cards are used in consumer transactions. More and more merchants, such a grocery store chains, are issuing consumer cards known as frequent shopper cards. These businesses promote use of these cards as an incentive to shop frequently and as convenient alternative to paper coupons. The object of these non-payment cards, similar to the frequent flyer programs run by certain payment card issuers, is to build loyalty by offering customers discounts and incentives. The customer presents the card to the merchant at the time of purchase, the card is scanned and certain items are discounted.

The advantage to the merchant is that such cards use a database which permits the merchant to track and reward the shopping habits of a particular customer, permitting the delivery of targeted offers and eliminating the need for cashiers to visually and electronically scan coupons. Like their payment card counterparts, these non-payment vehicles build customer loyalty and facilitate the collection of information on shopper's buying habits, preferences and demographics, thereby providing the merchant with valuable demographic and product information which will assist in the marketing and development of both new and existing products and services.

Other types of payment cards are known as SMART cards or e-cards. These cards are also an alternative to hard currency. A SMART card stores information digitally and, in some cases, incorporates the ability to interact with third-party computers or point-of-sale terminals. SMART cards are robust in their capabilities since they use embedded microprocessors powered by the in store terminal to store, process and transmit data.

Commonly used payment cards also include debit cards for both on-line (PIN based transactions) and off-line (signature based) transactions. The debit card is presented as the point-of-sale and "swiped". The user may then enter a PIN number or simply sign the receipt authorizing a direct deduction from a checking or savings account in the amount of the purchase or an amount that includes additional cash back to the cardholder.

Due to a recent class action suit the nation's merchants brought against Visa USA and MasterCard International, the future of issuer funded debit card programs is in question. Interchange fees will not be sufficient to cover the current costs associated with many programs. In January of 2004 VISA and MC will abandon the "honor all cards" rules that required merchants who accept credit cards also to accept signature based debit cards (so called off-line) debit cards. In sum, merchants will be able to accept VISA/MC credit cards without having to accept their debit cards.

This significant and fundamental change will create the opportunity for new and innovative solutions such as those contemplated in the present invention which shift the cost of the loyalty and reward programs from the issuers to the participating merchant.

In the United States today, an increasing plurality of consumer actively use payment cards or related electronic means of one type or another to purchase goods and services. Payment cards are used as a convenience, as a source of consumer credit, and as a source of intrinsic benefits such as airline miles or shopping "points". Regardless of the motivating force both the percent and dollar volume of all consumer transactions that are facilitated by payment cards continues to grow.

As the same time payment card use has been increasing, household savings rates in the United States continue to decrease and, in fact, are reaching historic lows. This situation is of particular concern to many American households in today's environment of uncertainty regarding the long-term viability of Social Security and increasing education and medical expenses.

Studies show that million of American households have not and are not adequately providing for retirement or other significant expenses. Further, government and private studies predict that the Social Security system will experience financial problems within the next fifteen years. According to the trustees, the United States Social Security system will actually become insolvent by the year 2029 if the government does not take remedial steps. These steps will most likely involve either an increase in taxes (further eroding savings) or a diminution in benefits (further exacerbating the retirement savings problem itself). Accordingly, it becomes more and more incumbent upon consumers to plan for their own retirement in order to ensure a secure future. This will only occur if overall household savings rates are increased.

Studies have also shown that workers born in 1950 can expect approximately $631 per month from Social Security. Had the worker invested his payroll tax in a 50/50 mix of government and corporate bonds, his monthly retirement income would have been approximately $1,069 per month. Had the same worker invested in a stock portfolio of 75% large capitalization companies and 25% small cap companies, he would receive monthly income of approximately $2,419 per month. Studies have also shown that Americans are becoming increasingly aware of their lack of personal savings and the potential shortfalls of the Social Security System and are receptive to alternative savings vehicles.

The present invention leverages the ever-expanding use of payment cards and other electronic payment means by consumers and the proliferation of traditional loyalty and reward programs, to address a fundamental problem facing a plurality of American households: How to create and implement a long-term savings plan.

Various rebate and refund systems can be found in both prior art and patent literature. For example, U.S. Pat. No. 4,750,119 describes a purchasing system with a rebate feature, which allows for the input of purchase orders and correlates transfer of funds from purchasers to vendors. A future benefit guarantor supplies the rebate factor, which is input into the system. The system then computes and reports the rebate, which is due in the future to each subscriber or purchaser. The system provides instructions to pay the vendors for selected goods and services and pay the future rebate guarantor a premium representing the purchase price of future guaranteed rebates. Preferably the premium is paid on a daily basis to the guarantor and a group annuity contract is funded.

U.S. Pat. No. 4,941,090 shows centralized computer cash value accumulation system based on point of sale transactions with multiple merchants. The consumer's account number and birth date are transmitted to a central system along with data identifying the merchant and a credit line determined by the merchant. At the central location, a cash value for that consumer is incremented by the credit value and a bill for that merchant is similarly incremented. Periodically the merchants are billed for the accumulated bill value. Also at selected intervals, consumers are given access to their respective accumulated cash values by either check or through funds dispensed electronically. Preferable the intervals are selected to correspond to the birth dates of the consumers.

U.S. Pat. No. 5,537,314 shows a credit accumulation and accessing system for a plurality of sponsors and participants. Under the control of an operational program, several tasks are accomplished including creating sub-directories for a single participant account so as to selectively associate the single account sub-directory with multiple sponsoring company accounts in deciphering and, accordingly at points of sale, calculating, posting and issuing discounts, raffle entries, store credit returns, points and cash values in accordance with the performance of participants. Award output devices provide consumers with access to funds based upon the cash value in the consumer account and may include wire transfer, check, cash coupon, payment card balance reduction or catalog merchandise.

In addition, U.S. Pat. Nos. 6,009,412 and 6,061,660 all describe methods and systems for conducting and supporting consumer loyalty and reward programs.

It is important to note that neither the prior art nor existing consumer loyalty and reward programs in the market today focus on, address or attempt to resolve the growing inability of a plurality of American households to independently and successfully save for retirement by using their payment cards for everyday spending at small mom and pop business. Studies have shown that 85% of household discretionary income is spent within a ten mile radius of the home which further evidences the need for a cost effective system to calculate and capture merchants sponsored discounts which are deposited into an investment savings account.

The current invention is an improvement over existing payment card based financial transaction systems due to the method in which the merchant sponsored fees are calculated, captured and collected. Micro investing programs—investing small amounts of money over a long period of time—as instituted by Boston based Upromise, Inc. and Atlanta based Babymint, Inc. have tied merchant sponsored discounts to college savings plans. The distinction is that these programs require that the fees be collected through automated clearinghouse (ACH) transactions which are cumbersome and many participating merchants resist giving a program administrator access to their bank accounts. Alternatively, the program administrator has to invoice their merchants for all fees related to qualified and eligible transactions. Historically, these "shop and save" programs have been limited to national merchants because of the difficulty associated with collecting payment from small mom and pop businesses. As a result, the merchants sponsored discounts are typically under ten percent since national merchants do not historically pay as large a discount as smaller, independently owned and operated businesses.

BRIEF SUMMARY OF THE INVENTION

Briefly, the present invention differs substantially from the prior art and is based on two underlying principles: 1) that consumers today are more acutely aware than ever that personal savings are and will remain an increasingly important component of a safe and secure retirement future; and 2) that merchants, payment card issuers and a wide variety of local, regional and national merchants are willing, as a sales inducement and loyalty and marketing opportunity, to pay a percentage of each qualified transaction into an investment savings account for the benefit of the participating consumer. These two principles combine to form the basis for the present invention, which benefits both business and the consumer.

The benefit offered to participating consumers is unique and the duration and nature of the customer relationship offered to participating merchants extends beyond college savings programs available today. For young consumers saving for retirement, the relationship spans decades. For older consumers helping children or grandchildren save for the future, the relationship spans generations. For all consumers, the nature of the benefit transcends 'points', 'miles' or simple cash discounts, all of which have become undifferentiated commodities in today's marketplace.

In sum, for those Americans who have difficulty creating and maintaining a long term saving plan or are vulnerable to the potential loss or diminution of Social Security benefits, this invention provides a new, unique and novel opportunity to accumulate meaningful savings, without changing current spending levels or habits or sacrificing existing quality of life. The system will be implemented without new or additional legislation and it will leverage, to the greatest possible extent, existing infrastructure, payment means, electronic communication and data processing.

Accordingly, in one aspect, the present invention provides a system based on a payment card for financial transactions which, with some modification, will utilize the existing financial structure and existing transaction processing hardware and software so that over a period of time, a portion of funds spent by users utilizing the payment card will be deposited an investment account. Funds deposited over a period of time such as the working life of an individual will accumulate and can only be withdrawn upon retirement or some other event such as a medical emergency, perhaps on a tax-advantaged basis.

The present invention provides a system in which an individual registers an existing card or applies for a new payment card. The user will have an identifiable account in a trust fund. The card will be issued by banks or other existing financial institutions such as credit unions. Individuals, upon consummating payment card purchases, will be rewarded with a rebate in a predetermined amount, which rebate would not go directly to the individual cardholder but rather would be deposited into the program administrator's account.

A small sales and marketing fee is collected to track and administrator the reward program and the bulk of the predetermined amount is then deposited into the cardholder's investment account. For example, the program administrator, using collective buying power, negotiates an 11% discount for all qualified transactions with a given merchant. The program administrator would the keep 1% and the remaining 10% would be deposited into the cardholder's investment account. The invention contemplates using the existing clearing and settlement process used by bank owned associates where clearing refers to the exchange of financial information and settlement refers to the exchange of the actual funds for the qualified transaction and the associated fees.

Periodic statements, such as quarterly, will be issued to the cardholders setting forth the activity and amount in the investment account. The funds will be treated as trust funds and be deposited in investments such as stocks, bonds and government securities. Another aspect of the system is that the individual cardholder will be able to select from a menu of securities such as high, low and moderate growth stocks that will be tailored to the time horizon and risk level of a particular cardholder. Participants could also deposit their rewards into federally insured savings accounts.

Another significant advantage of the present invention is that the system inherently provides a safeguard for inflation. As prices increase over time, increase savings will be effected as the rebate is based on a percentage of the amount spent.

The system further contemplates expanding services available to participants by providing additional services such as low cost loans, appraisal services, and insurance services provided by entities funded by the trust fund. Stock in these companies would be available to member participants.

The present invention will permit participating consumers to save for retirement or other permitted expenses by direction a portion of every qualifying purchase to a private, tax-deferred investment account.

The present invention will also permit benefit sponsors to establish and maintain long duration, extremely cost effective consumer relationships. Benefit sponsors may include payment card issuers, merchants, service providers, manufacturers, financial institutions and a host of other market participants. Bar code or SKU level data will also be used to identify select brands so that the system can track qualifying behavior for "baskets" of products purchased, for example, at a grocery store. By purchasing specific brands of laundry detergent, toothpaste or diapers the cardholder can accumulate cash back into their investment account. In this embodiment, the participating retailer will share transaction file history with the program administrator so that the data can be sorted to identify cardholder product selection at the point-of-sale. The system is designed to influence how consumers buy (e.g. MasterCard® debit or credit payment instruments), where the buy (participating retailers), and what they buy (specific products and services).

The system will leverage and use existing Internet advertising and on-line commerce platforms and technologies to the greatest extent practicable. Using secure data transmission facilities, the system will harvest all data required to administer the resulting program from various points throughout the entire commercial enterprise including, without limitation, payment card issuers and their designated processors, merchants and services providers and their designated processors, manufacturers, financial institutions, Internet portals and a wide variety of present and future benefit sponsors that do not fall neatly into any of the foregoing categories.

The program that results from the system described herein will be operated and administered by a "program manager". Except for the investment accounts actually held and administered by fiduciary(ies) on behalf of participating consumers, a program manager will maintain complete responsibility for the coordination and management of all aspect of the program, including, without limitation, the operation of the system.

The system will permit all consumers to participate on a variety of levels, using a variety of methods to pay for goods and services. The preferred payment method contemplates the use of a payment card (for example, VISA, MC, American Express or Discover) issued by a financial institution with a Bank Identification Number (BIN) or other number or feature unique to the system. Alternatively, consumers could register an existing payment card. Participating consumers use the issued and/or registered card to purchase goods and services in the same manner they would any other payment card. This method will permit the participating consumer to receive the widest variety and most comprehensive list of investment account benefits. As the program matures, consumers will also be able to pay with cash or check; provided, however, that they identify themselves with the point-of-sale system through a unique Personal Identification Number (PIN) or other identifier.

The system will permit card issuers, merchants, payment card processors, merchant acquiring institutions, banks, services providers, manufacturers and an essentially infinite variety of other business entities to participate as benefit sponsors and to offer benefits to participating consumers in the form of investment account deposits. The system's open architecture and ability to accept and assimilate data from disparate sources, places few limitations on benefit sponsor participation. The primary requirement will be the desire to reward participating consumers for engaging in specified behaviors by making a deposit into a participating consumer's investment account. In connection with participation, benefit sponsors will be entitled to communicate with participating cardholders in a variety of ways, discussed in greater detail below.

The participating consumer's investment accounts will be held by a fiduciary and have federal and state income tax benefits that will permit the participating consumer to receive deposits of principle and accumulate interest income for retirement or other permitted uses. Periodically, as funds are collected from benefit sponsors or their designated agents, the program manager will deliver (or arrange delivery of) the funds to the third party fiduciary, together will appropriate instruction directing the fiduciary to credit the correct amount(s) to each participating consumer.

The system and method will incorporate comprehensive audit, reconciliation and reporting capabilities that will comply in all respects with: (a) Generally Accepted Accounting Principals (GAAP); and (b) Federal, state and local regulations relating to the creation and maintenance of, and distributions from, investment vehicles. The system and method will also incorporate comprehensive periodic and customizable reporting for both participating consumers and benefit sponsors using established communication systems, which may include, but are not limited to, mail, phone, Internet, wireless and satellite communication devices.

The system will employ a variety of modes for communicating with participating consumers regarding special offers and other incentives and benefit sponsor communications, including, without limitation, periodic statements, piggyback communications (communications delivered with third party or other benefit sponsor communications), Internet web pages and hyper-links, directs e-mail, e-mail newsletters, broadcast fax and print, radio and television media. Benefit sponsors will use these modes, as well as approved independent modes, to communicate opportunities and special incentive to participating consumers. Consumer responses may then be tracked and monitored in highly refined and accurate reports generated for benefit sponsors.

Bank owned associations such as VISA and MasterCard are at the center of the transaction process, maintaining the flow of fund between issuers and acquirers. Clearing refers to the exchange of financial information. Settlement refers to the exchange of the actual funds for the transaction and the associated fees.

The acquirer credits the merchant's deposit account for the dollar amount of the sales less the agreed to fees. The acquirer sends the transaction, through a data transport network, to INET (for MasterCard transactions) or Base II (for VISA transactions). A financial institution may be both an issuer and an acquirer.

MasterCard and VISA send the transaction to the issuer overnight, credit the acquirer and debits the issuer for the transaction. In essence, the issuers pays the acquirer for the transaction, via the MasterCard or VISA interchange system.

Interchange makes it possible for the issuing banks and acquiring banks to exchange information, transactions and money on a standardized basis. During Interchange, fees are deducted by the issuer from the transaction amount and the net amount is paid by the issuer to the acquirer. These are called interchange fees.

The current invention uses this established network to enhance the value proposition for participating cardholders by calculating and collecting merchant sponsored discounts during the clearing and settlement process without the need for invoicing small businesses or ACH transactions.

BRIEF DESCRIPTION OF THE DRAWINGS

The above and additional features and advantages will become more readily apparent from the following description of the invention taken in conjunction with the drawings in which.

DETAILED DESCRIPTION OF THE DRAWINGS

Definitions

Figure 1:
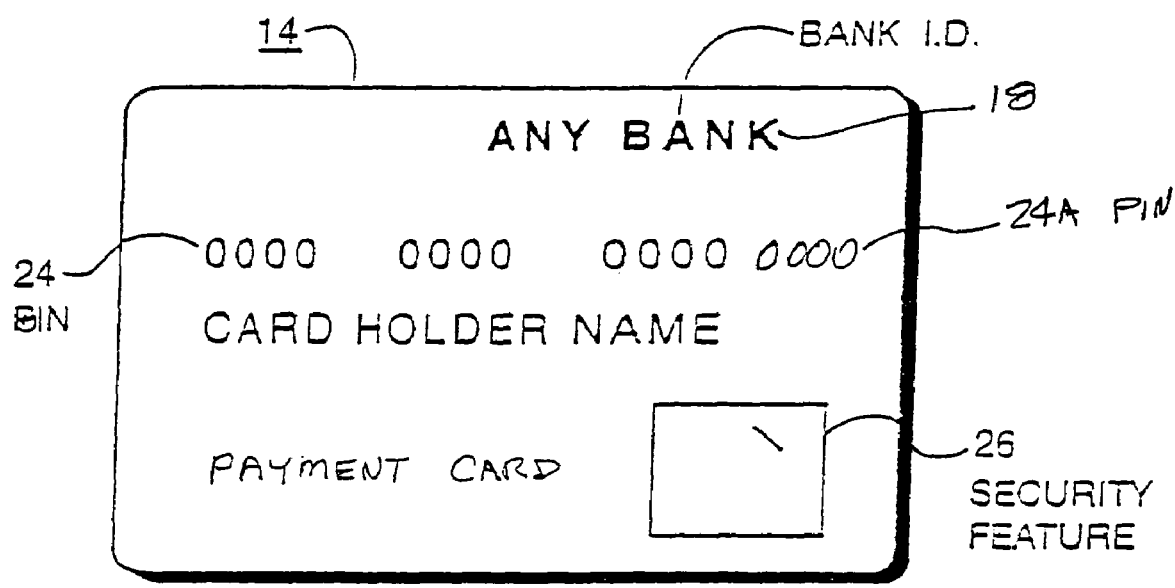
FIG. 1 shows typical payment card of the financial transaction system of the present invention that may be used by a participant.

For the purpose of this patent application, the following terms shall have the following meanings:

1. "Payment Card" means a debit or credit card or other debit access device that is issued by a financial institution, bearing the symbol of the financial institution such as a VISA or MASTERCARD logo, that accesses a customer's deposit account, and that is accepted by a Merchant for the purchase of goods and services.
2. "Benefit" means a reward offered to a Cardholder for his/her qualifying Transactions under a Program which may be cash or other rewards such as points or airline miles.
3. "Program" means the loyalty and rewards program administered by Program Administrator on behalf of participating cardholders in which cardholders receive benefits.
4. "Benefit Sponsor" means a merchant that has contractually agreed to participate in a loyalty program to offer a sales inducement, e.g. points, frequent flyer miles or cash back.
5. "Financial Institution" means a bank or credit union or other depository institution that issues Payment Cards.
6. "Cardholder" or "Participant" means a person who has been issued a payment card or other authorized access device.
7. "Cardholder Data" means the personal information relating to Cardholder, including but not limited to cardholder names, addresses and any information about purchases or Benefits earned that is traceable to any individual Cardholder.
8. "Qualifying Purchase on Transaction" means purchase(s) of product(s) and/or service(s) for which a Cardholder earned a Benefit according to Loyalty Parameters.
9. "Loyalty Parameters" means the condition stipulated in the Benefit Sponsor's agreement with the Program Administrator. Parameters can be determined by time of day, day of week or dollar amount, e.g. 5% cash back 10:00 a.m. to 2:00 p.m.; 10% cash back on Mondays and Tuesdays; 20% cash back on all transactions over $50.00.
10. "Program Administrator" means an entity which manages a coalition network of Benefit Sponsors which offer sales inducements for participating cardholders.
11. "Settlement" means the movement of funds that results in the withdrawal or deposit of funds to or from a Benefit Sponsor or from a Benefit Sponsor's deposit account to a Program Administrator in conjunction with Qualifying Transactions pursuant to a Merchant Agreement.
12. "Merchant Agreement" means the agreement(s) between Benefit Sponsor and the Program Administrator whereby the Benefit Sponsor agrees to participate in the Program and which provides for Settlement of Merchant Fees.
13. "Merchant Fees" means the agreed to fees pursuant to the Merchant Agreement which define the Loyalty Parameters.
14. "Clearing" means the exchange of information that leads to settlement. By way of example, but not limitation the card number, amount of purchase, date of purchase, time of purchase, product(s) SKU's purchased and other information related to a specific transaction.
15. "Acquiring Bank" means Benefit Sponsor's or Merchant's bank.
16. "Associations" means groups such as MASTERCARD and/or VISA.
17. "Settlement Processor" means an entity that will aggregate transactions, by bank or third party, for submission to interchange.
18. "Interchange" means exchange and pairing of data and distribution of funds from a transaction.

Figure 2:
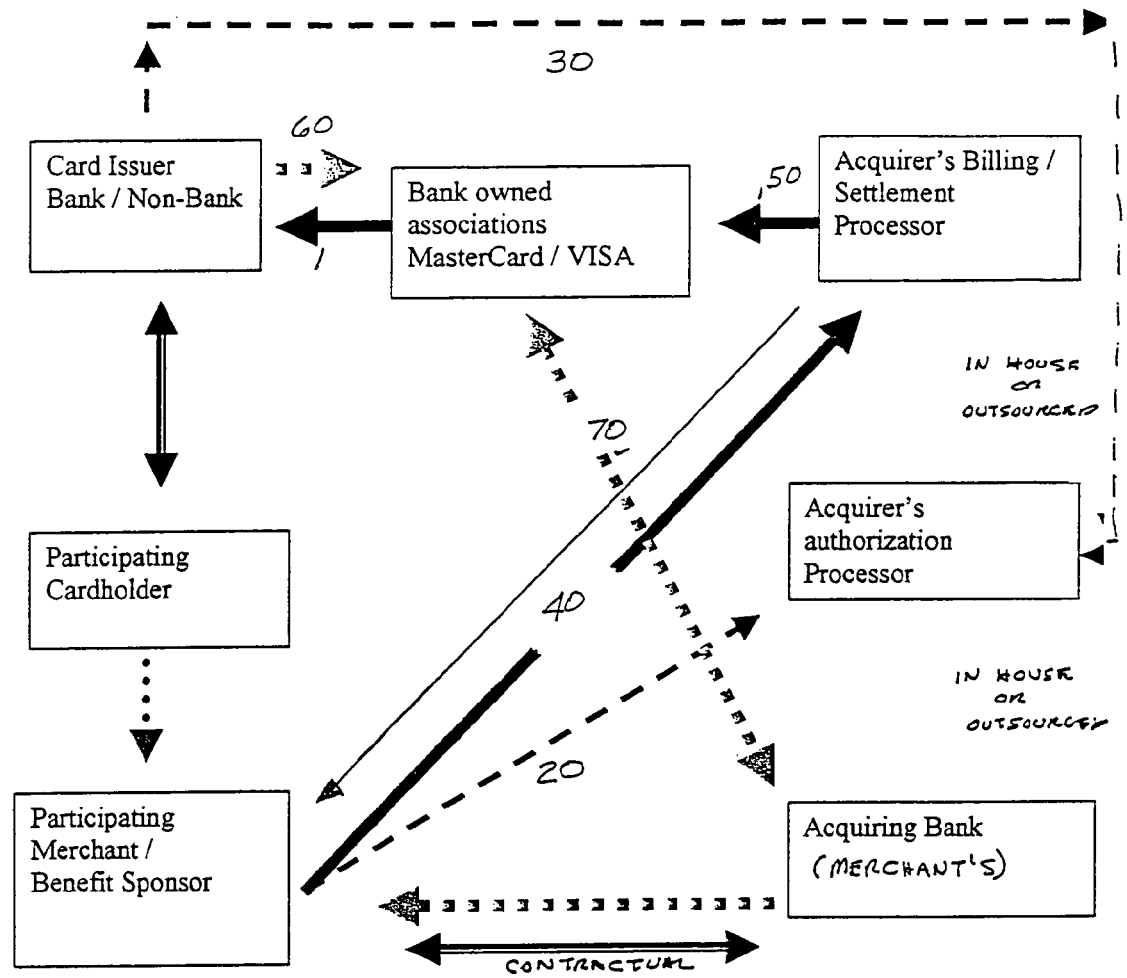
FIG. 2 shows the traditional transaction settlement flow.
Figure 2:
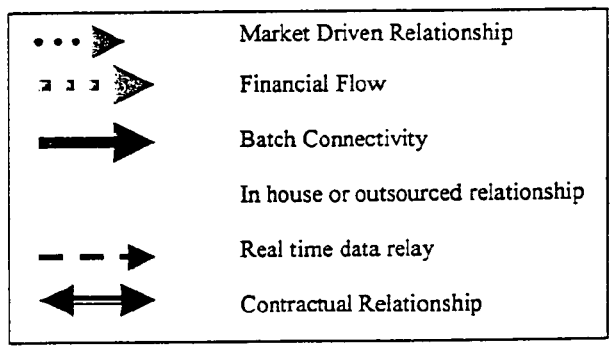

FIG. 2 illustrates the transaction flow that traditionally occurs when a cardholder enters into a qualifying transaction and the cardholder or customer makes a purchase of goods or services. In both FIGS. 2 and 3, the various paths are as indicated in this drawing legend. The payment card purchase is routed for authorization at 20. The Acquirer's authorization processor receives authorization at 30 from the card issuer and the transaction is approved. Periodically, as for example at the end of a business day, the Merchant will transmit a batch of authorized transactions to a Settlement Processor at 40. The Settlement Processor submits transactions into interchange with a request to pay and the Card Issuer funds its cardholder's purchase, net returns, charge backs and interchange fees at 60.

The Acquiring Bank at 70 credits the Merchant for a deposit, net returns, charge backs, Association Fees and Acquiring Bank fees. The Merchant is provided a summary statement of account activity and billed for acquirer services.

If a Merchant-sponsored reward or rebate is credited to the cardholder, these rewards are currently settled by charging the Program Sponsor, usually the Merchant. For example, if a Merchant such as a restaurant provides a 20% discount on a food bill, the cardholder's account will be credited this amount in the initial clearing stage. However, the Program Sponsor is charged, usually three to 30 days later, by automatically debiting an amount from the merchant's bank account, by an operation termed Automated Clearing House ("ACH"). Merchant's dislike this practice because the automatic charge occurs at intervals without notice and may occur at a time when a Merchant has a low bank balance. A charge, particularly in a large amount representing batched transactions, may be financially disrupting to the Merchant.

The present invention is a transaction processing system which is termed "net settlement." The present system avoids the hardship that may be imposed on Benefit Sponsor with the present systems (FIG. 1) when settling and transferring credits, less debits such as fees and charges, in real time and without having to later debit a sponsor's account. The system is applicable to payment card transactions in which a rebate or reward from a Benefit Sponsor, such as a Merchant, accrues to the benefit of a participant.

An individual applies for and, upon approval, will be issued an access device such as a card 14 as seen in FIG. 1. A bank or other organization 18 would issue the card 14. In the event that the individual is applying for a new payment card 14, the applicant provides the usual personal and financial information, which is processed using prescribed standards and, if the requirements are met, approves the applicant as a Payment Cardholder. The payment card may be a newly issued card or the individual may register an existing card or may use some other type of access device.

FIG. 1 shows a representative payment card 14. The individual will have an identifiable account number 24A which would be unique to the card holder. The account number may correspond to the user's social security number of the card holder or may be some other PIN. A portion of the number, usually four digits, is the bank identification number 24 (BIN). The card 14 has characteristic of a payment card with a predetermined spending limit issued by a bank or other organization as is conventional or could also be a SMART card which electronically stores funds up to a certain amount. A SMART card would include a verification number and a de-encryption algorithm for security. Security can also be provided by other verification techniques such as biometrics. A security feature 26 such as photograph, thumb print, hologram or some other security feature such as microchip may be included to ensure that only the authorized card holder may use the card. The card may include other features such as debit features to allow the card holder to debit selected accounts upon the purchase of goods and services. The card 14 will also authorize access to various accounts and perform various transactions.

Benefits also accrue to Merchants as Benefit Sponsors will advertise that they accept the card 14 which will enhance business by attracting additional business and customers. Participating Merchants may be conventional retail merchants such as supermarkets, department stores, restaurants and the like or even professional such as lawyers, doctors and accountants. In addition, participating Merchants may also be less traditional merchants such as casinos where the card holder may purchase casino credits in a predetermined amount. Thus, those Merchants that participate by accepting the card should experience increased business by appealing to a broader segment of the consuming society. The user will tend to place more expenditures using the card 14 and, by doing so, will add to the investment funds and, in some instances, be entitled to a rebate or reward from the Benefit Sponsor.

If the rebate is a cash rebate, it may be transferred into an Investment Account administered by a Fiduciary and disbursed at a later date such as upon the occurrence of a specified event. The Investment Account is a professionally managed fund and amounts that are transferred will be credited to the card holder's account using the card holder's account designation such as the PIN 24A assigned to the particular card holder. Periodically, the card holder will receive a statement from the issuing bank reflecting charges for a billing cycle as, for example monthly. The Cardholder will then pay the amount or at least a minimum monthly fee to the bank.

The advantages of the system are many. The system is driven to some extent by the individuals desire to be able to make purchases conveniently using the card 14 and also by the Cardholder's concern for a more secure financial future. Businesses benefit as the system will generate a larger customer base and increased sales. In addition, all merchant fees are paid of a success fee basis, i.e. no transaction, no fee. As pointed out above, there is a built-in hedge against inflation as credit or rebates are based on a percentage of sales amounts. In addition, costs of the system could be offset by advertising income that would accompany statements sent to the Cardholders. Goods and services could also be promoted through web pages or web sites dedicated to the program manager and its Benefit Sponsors.

Figure 3:
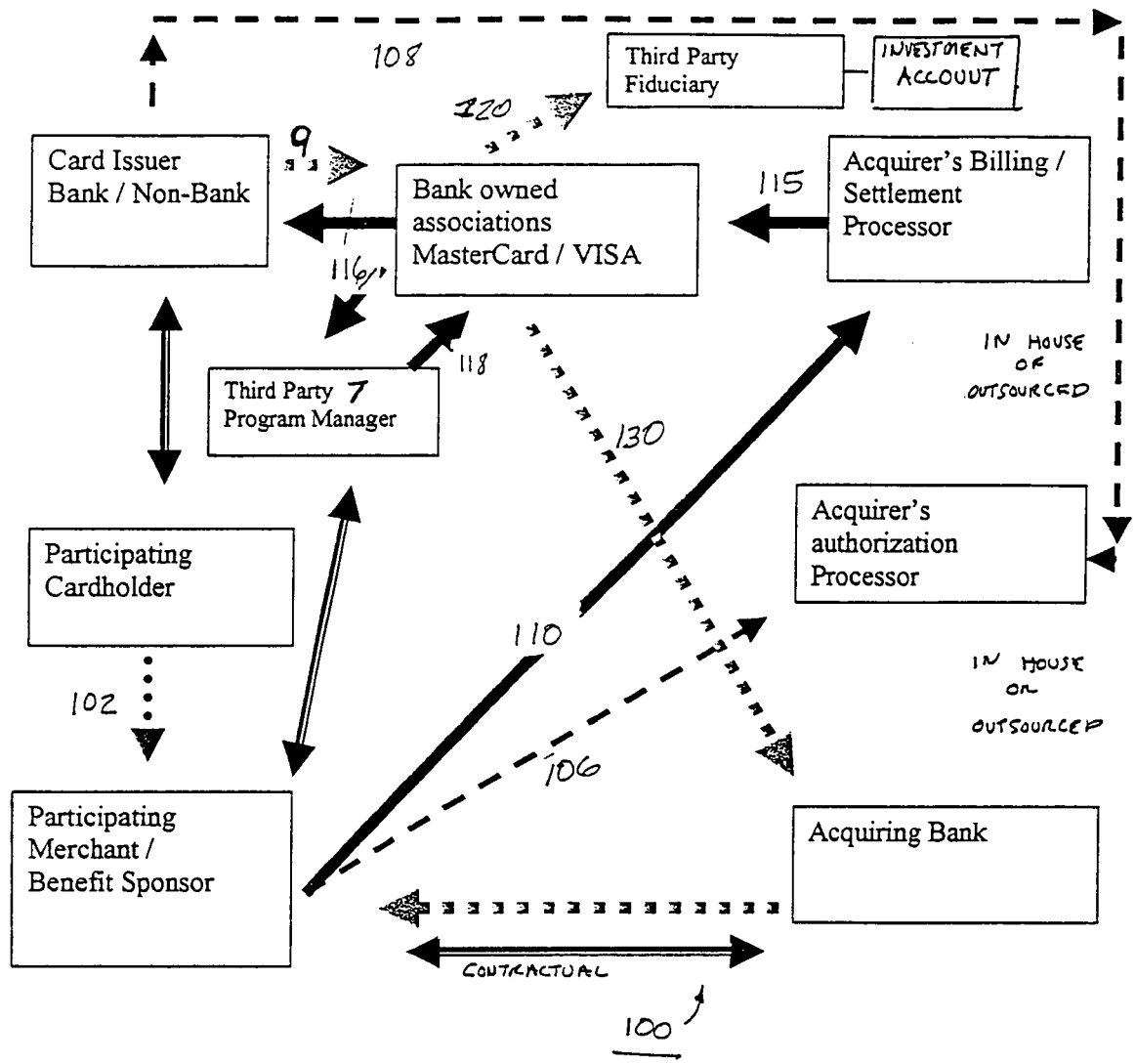
FIG. 3 is a schematic diagram of the financial transaction system of the present invention which provides a general overview of the settlement.
Figure 3:
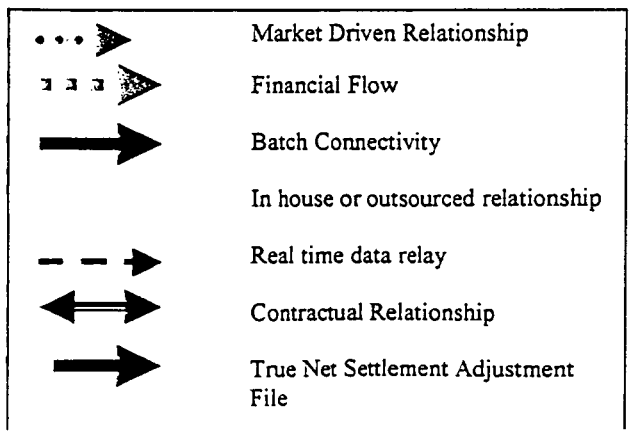

Turning now to FIG. 3, the net settlement system of the present invention is shown and generally indicated by the numeral 100. At numeral 102, a participating Cardholder requests purchase from participating Merchant. The purchase is routed for authorization at 106 and forwarded to the Card Issuer at 108. The payment card purchase is authorized and the Merchant is advised of the approval. At the end of the daily business cycle, the Merchant transmits a batch 110 of all authorized transactions including both qualified and non-qualified loyalty and reward transactions. At numeral 115, the Settlement Processor transmits transactions to the bank-owned interchange system with request to pay. Bank-owned Associations associated with the system are those such as MASTERCARD and VISA.

At 116, the bank-owned association(s) send daily filtered transaction fee to the Program Manager matching a database of participating cardholder against participating merchants. The Program Manager captures the qualified transactions and applies the 'loyalty logic' to calculate the 'merchant marketing fee'. The logic is programmed to calculate the reward based on the transaction and the type and value of the merchant's benefits reward program. This fee includes both the cardholder's investment deposit and a program administration fee. The Program Manager sends daily settlement adjustment feed back to the Association with calculation for marketing fee amount for all qualified transactions which is shown at 118.

The Issuer funds its Cardholder's purchase, net returns, charge-backs and interchange fees. During the settlement adjustment the merchant marketing fee is taken from the settlement process and paid to third party fiduciary/account custodian, or Program Manager who then, at 120, deposits the Cardholder's rebate less the program administration fee for the Cardholder's benefit. The rebate may go directly into the Investment Account or may be held by the Third Party Fiduciary until the Cardholder's account reaches a predetermined value or amount. Simultaneously, at 130, the bank-owned association, via interchange, fund the Acquiring Bank net returns, charge-backs and agreed to fees such as the Merchant Marketing Fee. The Acquiring Bank credits the Merchant for deposits, net returns, charge-backs, association fees, acquiring bank fees and merchant marketing fee. In this embodiment, a third contractual relationship is in place between the Program Manager and Merchant.

A summary of the transaction flow is as follows:
1. Participating Cardholder requests purchase from participating Merchants and Benefit Sponsors.
2. Payment card purchase is routed for authorization.
3. Payment card purchase is authorized.
4. Merchant transmits batch of all authorized transactions including both qualified and non-qualified transactions.
5. Settlement Processor submits transactions into interchange with request to pay.
6. Bank-owned Association(s) send daily filtered transaction feed to 'Program Manager' thereby matching participating Cardholders against a database of participating Merchants.
7. Program Manager applies the "loyalty logic" against all qualified transactions and calculates the Marketing Fee Amount which includes both the Cardholder investment deposit and program administration fees.
8. Program Manager sends daily settlement adjustment feed back to the bank-owned Association with calculation of Marketing Fee Amount for all qualified transactions.
9. Card issue funds its Cardholder's purchase (net returns, charge-backs and interchange fees).
10. During the settlement adjustment, the Merchant fee is taken from the settlement process during interchange and paid to the Third Party Fiduciary.
11. Simultaneously, the bank-owned Association, via interchange, funds the Acquiring Bank net returns, charge-backs and agreed upon fees, i.e., the Merchant discount plus the Merchant marketing fee.
12. Acquiring Bank credits the Merchant for deposits (net returns, charge-backs, association fees, Acquiring Bank fees and Merchant marketing fees).
13. In the traditional transaction flow there is contractual relationship between the Card Issuer and the Cardholder and the Merchant and Acquiring Bank. In this embodiment, a third contractual relationship will be in place between the Program Manager and the Participating Merchant.

EXAMPLE

For Example, a typical credit card transaction will currently involve administration and transaction fees of about 1.6% shared by the Settlement Processor, Association and Card Issuer. This leaves 98.4% with the present model, a rebate may be 10% to the Cardholder and a fee of 2% assessed. Thus, the Acquiring Bank would receive a net of 86.4% of the purchase amount. The rebate of 10% will be paid either directly to the Third Party Fiduciary by the Association or indirectly via the Third Party Administration. The Third Party Administration would retain the Administration Fee, in this instance 2%.

Rebates may be a cash credit or other reward funded by the Benefit Sponsor normally the merchant. Preferably, the credit, if in cash, is invested into an Investments Account which will be administered by a professional manager and available to the Cardholder or his or her beneficiary upon the occurrence of an event such as retirement or the need to meet large expenses such as educational or medical expenses.

A significant benefit is that the Benefit Sponsor's account is not subject to ACH debits for rebates and fees in the settlement process. Rather, the Merchant's account is credited an amount net of these charges. In summary, the Program Sponsor is paid the same time as the Program Administrator is paid.

The system benefits all involved in that Benefit Sponsors can offer a variety of rebate programs to encourage trade. For example, different discounts to a restaurant purchase may apply at different time, e.g., lunch customers may be entitled to a 20% discount and every dinner only 10%. The loyalty process logic administered by the Program Manager will be programmed to apply the proper logic to establish the rebates.

Another embodiment of the present invention involves transactions in which a Cardholder purchases a basket of goods from a local retailer. A participating cardholder, for example, may purchase many items when only select items qualify for a rebate. In this illustration, if the cardholder purchases a certain brand of toothpaste, detergent and diapers (e.g. Proctor & Gamble® Crest®, Tide® and Pampers®), these items would qualify for a 25¢ rebate on each item for a total of 75¢ cash back into the saving account. Alternatively, the Cardholder may have to purchase all three items to qualify for the 75¢ rebate as defined by the loyalty parameters in the merchant agreement.

For online Internet transactions, a retailer such as an online book seller may offer 10% cash back for all transactions of $50.00 or more. In yet another embodiment of the present invention, a local "mom & pop" business may offer seasonal incentives during off-peak days, weeks or months.

This degree of customization provides the Merchant the flexibility to drive incremental revenue on a success fee basis while maintaining price integrity with highly measurable results.

The cardholder may receive his or her rebate in an Investment Account which will grow over time conferring a saving benefit. The banks, processors and others all benefit from the increased business and the increased savings available to individuals as for example upon retirement.

The Cardholder is preferable provided a menu from which the card holder could select the type of investments to be made with the card holder's funds on deposit in the fund.

These funds would be professionally managed and would be broadly categorized as a high, medium or low yield investment or mixture of such investments depending of the objectives and personal preference of the individual card holder. The result is privatization of retirement funding. Significant advantages would be that the system would relieve the pressure from the faulty Social Security system and, at the same time, increase benefits to participants.

It will be obvious to those skilled in the art to make various changes, alterations and modifications to the invention described herein. To the extent such changes, alterations and modifications do not depart from the spirit and scope of the appended claims, they are intended to be encompassed therein.

We claim:

1. A financial transaction system in which a cardholder is issued a qualified payment card by an issuer through an association and which may be used at a plurality of benefit sponsors each benefit sponsor having an acquiring bank, which, when used, entitles the cardholder to a cash rebate, said system comprising:
   (a) providing an acquirer authorization processor;
   (b) providing an acquirer's billing settlement processor;
   (c) providing a cardholder investment account;
   (d) routing a card purchase from a benefit sponsor to the authorization processor upon presentation by a cardholder;
   (e) transmitting authorization to the benefit sponsor;
   (f) applying logic to qualified transactions to calculate marketing fee and rebate amounts;
   (g) transmitting settlement adjustment amount to the association with calculated fees and amounts;
   (h) funding purchasing by transmitting funds to the merchant acquiring account less fees and rebates;
   (i) concurrently with (h) crediting rebate amounts to the cardholder investment account; and
   (j) paying merchant marketing fees to the association.

2. The system of claim 1 where the merchant sponsored rebate is captured by an organization during interchange for deposit into the cardholder's investment account.

3. The system of claim 1 where the cardholder registers a unique card number with a third party administrator.

4. The system of claim 1 where the cardholder register their unique card number with a bank owned association.

5. The system of claim 1 where the cardholder registers a unique card number with a publicly traded association.

6. The system of claim 1 where the merchant registers a merchant ID with a third party administrator.

7. The system of claim 1 where a merchant registers their merchant ID with a payment card processing company.

8. The system of claim 1 where all qualified or eligible transactions are identified by a third party administrator.

9. The system of claim 1 where the loyalty logic is applied against a database of participating cardholders and participating merchants.

10. The system of claim 1 where a merchant marketing fee is applied and calculated against a database of participating cardholder and merchants by a third party administrator.

11. The system of claim 1 where the cardholder and merchant marketing fee is captured by an association as a settlement adjustment and Merchant Marketing Fee is credited to the third party administrator and the cardholder rebate or discount is credited to the cardholder's investment account.

12. The system of claim 1 where data mining occurs for qualified transaction is done by a third party administrator.

13. The system of claim 1 where the data mining occurs for qualified transactions and is done by a bank owned association.

14. The system of claim 1 where the merchant marketing fee includes the cardholder's investment savings deposit.

15. The system of claim 1 where the cardholder elects to participate by registering a payment card information in conjunction with opening a FDIC insured savings account via a global telecommunications network.

16. The system of claim 1 where the cardholder elects to participate by registering a payment card information in conjunction with establishing an investment account with a financial services company.

17. A financial transaction utilized by a plurality of participants and participating benefit sponsors comprising:
   (a) issuing each participant an access device;
   (b) establishing an account for the participant under a unique account number, such that the account is an investment account;
   (c) means for approving the transaction and transmitting approval to the benefit sponsor;
   (d) means for processing information regarding a purchase and transmitting said information for processing such that a rebate may be calculated and funded by the benefit sponsor; and
   (e) net settling the transaction by concurrently funding the participant's purchase, paying administration fees, transferring a rebate amount to the investment account and paying the benefit sponsor a net amount.

18. The financial transaction of claim 17 wherein the access device is selected from the group consisting of credit cards, debit cards and SMART cards.

19. The financial transaction of claim 17 wherein the rebate amount is first transferred to a fiduciary to be held until the value in the participant's account reaches a predetermined value at which time it is transferred to the said investment account.

* * * * *